US007996031B2

(12) United States Patent
Kiiskila et al.

(10) Patent No.: US 7,996,031 B2
(45) Date of Patent: Aug. 9, 2011

(54) METHOD AND SYSTEM FOR PROVIDING A NETWORK PROTOCOL FOR UTILITY SERVICES

(75) Inventors: Marko Kiiskila, Lestijarvi (FI);
Padmasheela Rayala, Lestijarvi (FI);
William San Filippo, III, Los Altos Hills, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 0 days.

(21) Appl. No.: 12/852,552

(22) Filed: Aug. 9, 2010

(65) Prior Publication Data
US 2010/0302062 A1 Dec. 2, 2010

Related U.S. Application Data

(62) Division of application No. 11/560,938, filed on Nov. 17, 2006, now Pat. No. 7,797,009.

(60) Provisional application No. 60/738,088, filed on Nov. 17, 2005.

(51) Int. Cl.
*H04B 7/00* (2006.01)
(52) U.S. Cl. ....... 455/519; 455/445; 455/41.2; 455/500; 455/502; 455/507; 455/509; 455/513; 455/514; 455/515; 455/517; 455/518; 455/556.1; 455/556.2; 709/238; 709/242; 709/243; 709/244; 340/870.01; 340/870.02; 340/870.03; 370/229; 370/230; 370/230.1; 370/231; 370/235; 370/236; 370/237
(58) Field of Classification Search ............. 455/445, 455/41.2, 500, 502, 507, 514, 556.1, 556.2, 455/557, 509, 512, 513, 515, 517, 518, 519; 340/870.01–870.03; 709/220–222, 238–244; 370/229, 230, 230.1, 231, 235, 236, 237
See application file for complete search history.

(56) References Cited

U.S. PATENT DOCUMENTS

| 5,673,252 | A  | * | 9/1997  | Johnson et al. | 370/449    |
|-----------|----|---|---------|----------------|------------|
| 6,246,677 | B1 | * | 6/2001  | Nap et al.     | 370/346    |
| 6,590,928 | B1 | * | 7/2003  | Haartsen       | 375/134    |
| 7,064,679 | B2 | * | 6/2006  | Ehrke et al.   | 340/870.02 |
| 7,277,027 | B2 | * | 10/2007 | Ehrke et al.   | 340/870.12 |
| 2003/0122686 | A1 | * | 7/2003  | Ehrke et al.   | 340/870.02 |
| 2005/0172024 | A1 | * | 8/2005  | Cheifot et al. | 709/225    |

OTHER PUBLICATIONS

International Search Report mailed Oct. 25, 2007.

* cited by examiner

*Primary Examiner* — Tuan A Tran
(74) *Attorney, Agent, or Firm* — Buchanan Ingersoll & Rooney PC

(57) ABSTRACT

A method and system for providing a network protocol for utility services are disclosed are disclosed. In one embodiment, a computer-implemented method comprises discovering a utility network, wherein a constant powered meter sends network discovery messages to find the utility network. Neighboring meters are discovered, wherein the constant powered meter sends hello messages periodically. The constant powered meter is registered with the utility network. Further, the battery powered meter finds and associates itself with a constant powered meter. The constant powered meter also registers its associate battery powered meter with the utility network. The constant powered meter sends a node registration message to the gateway of the utility network. The constant powered meter can sense outage problems with the gateway and the neighbors of its network, and search and migrate to an alternate network.

34 Claims, 9 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers| Type | Seq Number  |R| Hop Cnt  |A| Resp Timer          |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers| Type |  Seq Number  |   Reserved    |    GW Load    |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers| Type |  Seq Number   |TXPwr|Res|PC|   GW Load    |
+-+-+-+-+-+-+-+-+-+-+-+-+-+-+-+-+-+-+-+-+-+-+-+-+-+-+-+-+-+-+-+-+
|Path1 Length | Path1 Metric |    Path1 Hop1 L2 Address       |
+-+-+-+-+-+-+-+-+-+-+-+-+-+-+-+-+-+-+-+-+-+-+-+-+-+-+-+-+-+-+-+-+
|         Path1 Hop1 L2 Address (cont)        |
+-+-+-+-+-+-+-+-+-+-+-+-+-+-+-+-+-+-+-+-+-+-+-+-+-+-+-+-+-+-+-+-+
|              Path1 Hop2 L2 Address          |
+-+-+-+-+-+-+-+-+-+-+-+-+-+-+-+-+-+-+-+-+-+-+-+-+-+-+-+-+-+-+-+-+
|Path1 Hop2 L2 Address (cont) |...
+-+-+-+-+-+-+-+-+-+-+-+-+-+-+-+-+-+-+-+-+-+-+-+-+-+-+-+-+-+-+-+-+
 ...
+-+-+-+-+-+-+-+-+-+-+-+-+-+-+-+-+-+-+-+-+-+-+-+-+-+-+-+-+-+-+-+-+
| Optional configuration items ...
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers| Type |  Seq Number  |    Status    |    Reserved    |
+-+-+-+-+-+-+-+-+-+-+-+-+-+-+-+-+-+-+-+-+-+-+-+-+-+-+-+-+-+-+-+-+
```

FIG. 9

METHOD AND SYSTEM FOR PROVIDING A NETWORK PROTOCOL FOR UTILITY SERVICES

CROSS REFERENCE TO RELATED APPLICATIONS

This application is a divisional of application Ser. No. 11/560,938, filed Nov. 17, 2006, which in turn is a non-provisional patent application of Application No. 60/738,088, filed Nov. 17, 2005.

FIELD OF THE INVENTION

The field of the invention relates generally to computer systems and more particularly relates to a method and system for providing a network protocol for utility services.

BACKGROUND OF THE INVENTION

Automated Meter Reading (AMR) started out as a more efficient and accurate method for utility metering data collection, compared to manual meter reading of electric, gas and water meters. Several important advantages of AMR over manual meter reading helped develop it into a specialized branch of the data communications and telemetry industry. Worth noting among these advantages are the reliability, accuracy and regular availability of metering data, collected from hard-to-reach meter locations as well as from standard meter locations; higher customer security (no need to enter homes) and satisfaction (accurate bills); and reduced cost of customer service call center and service house calls for settling billing disputes.

Various technologies are implemented in AMR. All implementations perform the tasks of interfacing with the meter in order to sense consumption, retrieving and communicating back the stored consumption data in the meter (stored in formats that are compliant with utility meter data protocol standards) to a central site, and storing consumption data in a computer system at the central site. Wireless technologies have become the most common in AMR system implementation due to the ease of the installation process and, in many cases, the low initial and operating costs of the system.

Among wireless implementations of AMR, a categorization has been established between mobile data collection systems and fixed-base data collection systems, or networks. Fixed networks may be based on wireless or wireline. However, the real advantages are with systems based on fixed wireless networks. Fixed network systems have some important distinctive advantages, brought about by the frequent (typically at least daily) consumption data collection, in comparison with mobile systems, which merely provide a more reliable method of collecting monthly meter reads for billing purposes. Worth noting among these advantages are: flexibility of billing date; marketing tools such as time-of-use (TOU) rates, demand analysis and load profiling, which enable clearer market segmentation and more accurate forecasts for utility resource generation, and also serve the goal of energy conservation and efficient consumption; and maintenance tools such as immediate notification of utility resource leakage or of account delinquency. These advantages have triggered increased interest and commercial activity regarding fixed network data collection systems for utilities, particularly utilities in regions undergoing deregulation of utility services.

Several methods and systems for implementing fixed network data collection from a plurality of remote devices, such as utility meters, to a central location, have been developed and introduced in the past years. A categorization has evolved as the AMR industry developed, generally differentiating between one-way and two-way fixed wireless data networks. Prior systems require that each meter module on the network be a two-way module, i.e. contain a receiver circuit in the meter module. Although two-way communication features such as on-demand meter reading and other remote commands for meter configuration and control are generally desirable, they may not be required for the entire meter population of a utility. Since the inclusion of a receiver in the meter module contributes significant cost to the module, it would be most desirable to allow a utility service company the flexibility to deploy an AMR network, which may contain and support both one-way and two-way meter modules.

A disadvantage of networks with distributed intelligence among the data collection nodes is the limited storage and processing power of the data collection nodes. A system that could efficiently transfer all the raw data from the meter modules to the network's central database would therefore be desirable, since it would allow for more backup and archiving options and also for more complex function calculations and processing on the raw meter data.

SUMMARY

A method and system for providing a network protocol for utility services are disclosed. In one embodiment, a computer-implemented method comprises discovering a utility network, wherein a constant powered meter sends network discovery messages to find the utility network that it is a part of. Neighboring meters in the utility network are discovered, wherein the constant powered meter sends hello or status messages periodically. The constant powered meters are registered with the utility network. The constant powered meter sends a node registration message to a gateway. The gateway is the intermediate agent/central node in the network through whom a family of constant powered meters and battery powered meters communicate with the central server of the utility network.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 5 illustrates an exemplary hello message header, according to one embodiment;

FIG. 7 illustrates an exemplary node registration acknowledgement message, according to one embodiment;

FIG. 8 illustrates an exemplary route update message sent by gateway to update settings for a CPD node, according to one embodiment; and FIG. 9 illustrates an exemplary route update acknowledgement message, according to one embodiment.

DETAILED DESCRIPTION

Figure 1:
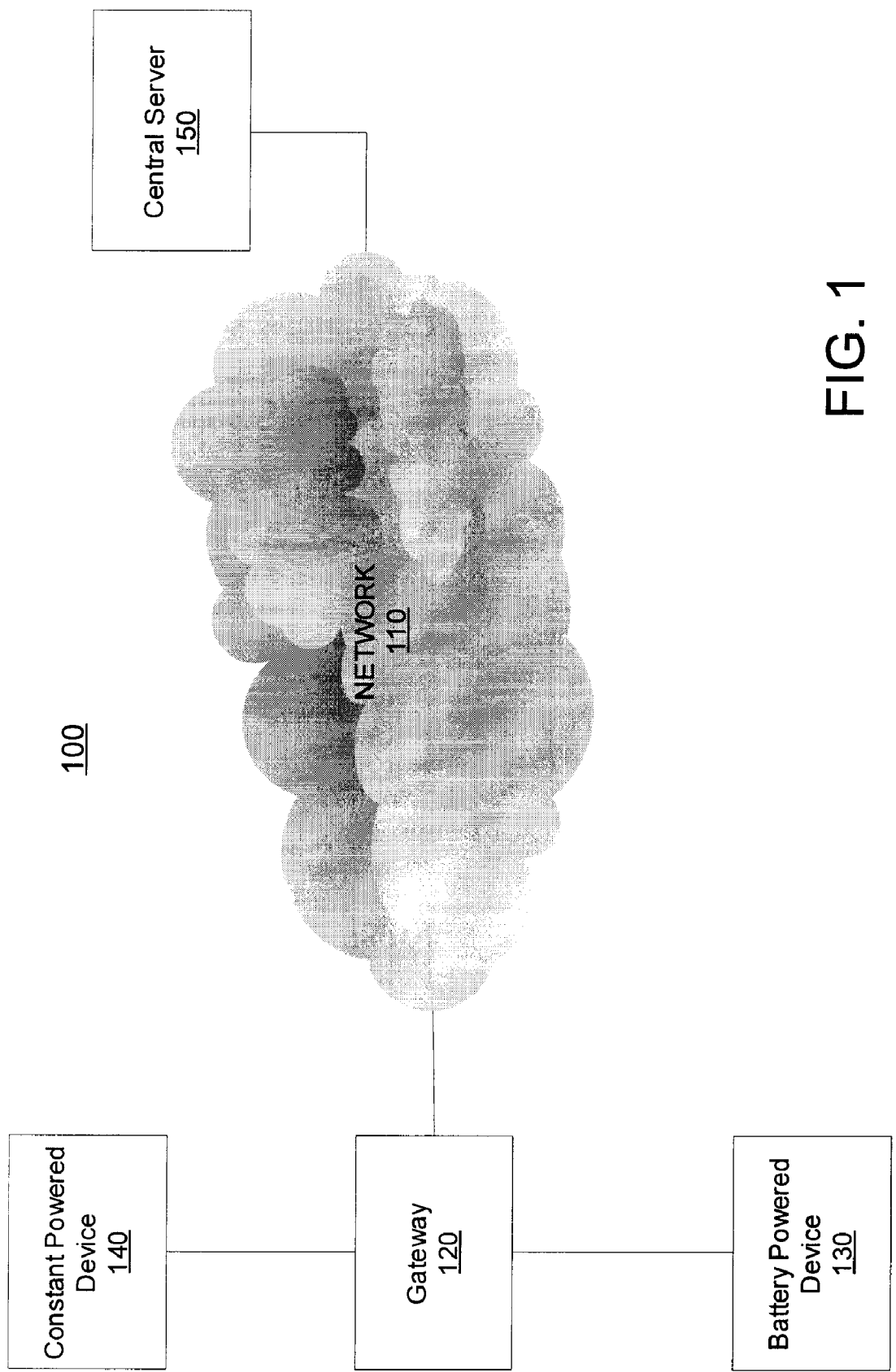
FIG. 1 illustrates a block diagram of an exemplary utility network, according to one embodiment of the present invention.

A method and system for providing a network protocol for utility services are disclosed. In one embodiment, a computer-implemented method comprises discovering a utility network, wherein a constant powered meter sends network discovery messages to find the utility network that it is a part of. Neighboring meters in the utility network are discovered, wherein the constant powered meter sends hello or status messages periodically. The constant powered meter are registered with the utility network. The constant powered meter sends a node registration message to a gateway. The gateway is the intermediate agent/central node in the network through whom a family of constant powered meters communicate with the central server of the utility network.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of serial and parallel steps leading to a desired result. The steps are those requiring manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, pixels, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related or restricted to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of an exemplary utility network 100, according to one embodiment of the present invention. Utility network 100 includes a data communications network 110, at least one gateway 120, at least one battery powered device (BPD) 130, and at least one constant powered device (CPD) 140. A centralized server 150 collects data from battery powered devices 130, and constant power devices 140. Data is communicated between nodes and server 150 in utility network 100 according to a network utility protocol.

Generally, the present network communication protocol is designed to operate in a dense multi-hop radio network, where nodes are fixed to a specific location. There is a central node (e.g., gateway 120) which plays a significant role in managing the network. BPD 130 and CPD 140 have very limited amounts of available memory and processing capabilities.

Gateway 120 is a central node which communicates with all of the other nodes, either directly or via relay. CPD 140 may be one or more meters and relays in the utility network 100. Meters are able to relay packets between other meters (CPDs 140 and BPDs 130), and between meters and the gateway 120. BPD 130 may be one or more battery powered meters and relays. They are limited in transmit power, uptime, and processing capabilities compared to CPDs 140. According to one embodiment, BPDs 130 are not able to relay packets. BPDs' 130 packets might be relayed by regular meters.

The topology of the network 100 is expected to change slowly. Nodes, such as BPDs 130 and CPDs 140 stay in the network for years, and the characteristics of a radio link between them changes quite slowly, except for transient noise sources and obstacles for RF propagation. The applications using network 100 are utility meter reading, management required for those meters, and management of other devices owned by utility companies.

Figure 2:
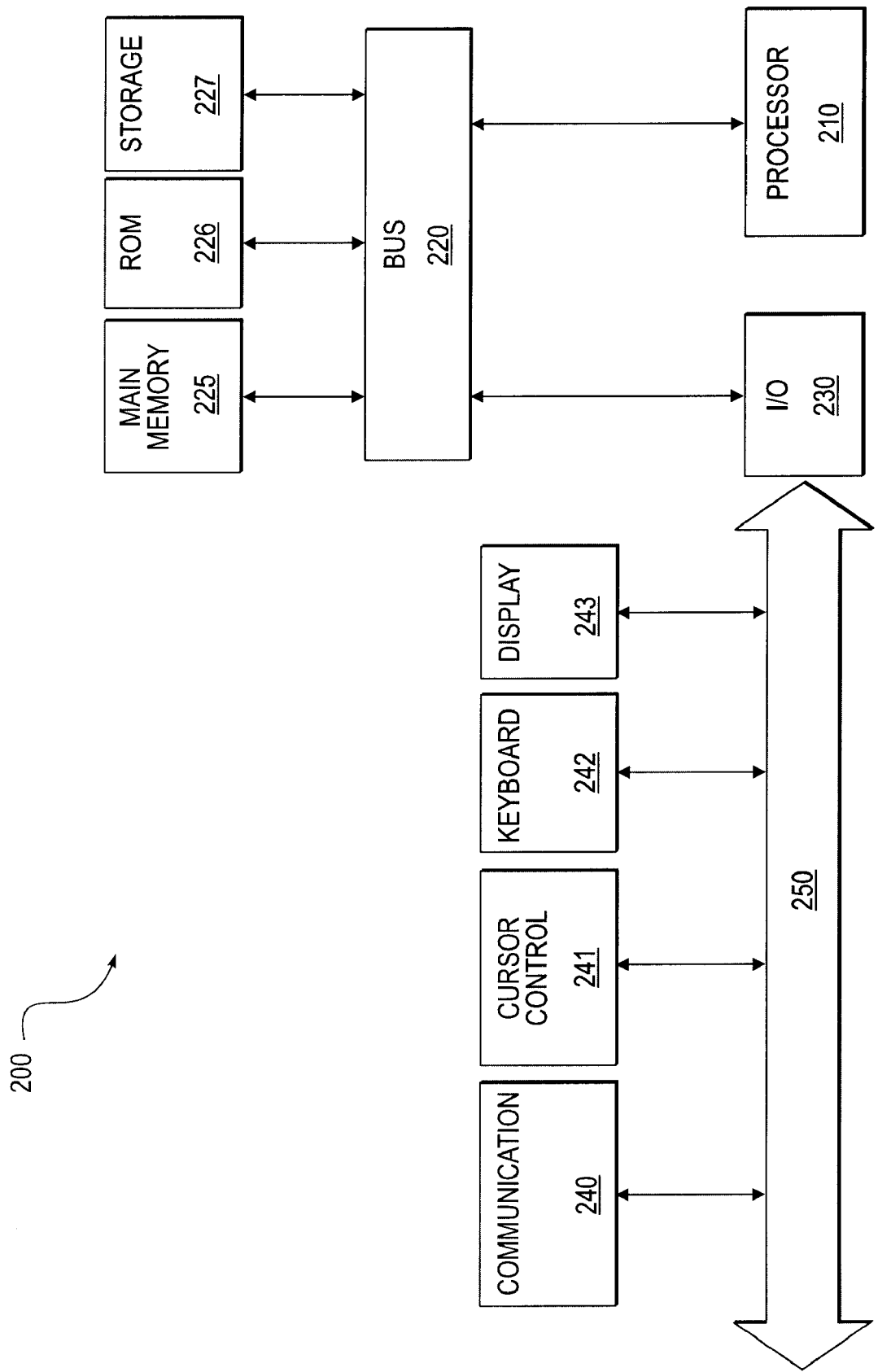
FIG. 2 illustrates an exemplary computer architecture for use with the present system, according to one embodiment of the invention.

FIG. 2 illustrates an exemplary computer architecture for use with the present system, according to one embodiment of the invention. Computer architecture 200 can be used to implement gateway 120, BPDs 130, CPDs 140 or a server 150 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241).

The communication device 240 allows for access to other computers (servers or clients) via a network. The communication device 240 may comprise a modem, a network interface card, a wireless network interface or other well known interface device, such as those used for coupling to Ethernet, token ring, straight IP, or other types of networks.

Overview

Nodes, such as BPDs 130 and CPDs 140, discover available networks (network 110), select one they should join, and then register themselves with the gateway 120. This central node gateway 120 keeps track of the network topology and capabilities of all devices in its control, and also other devices. Based on this info, it calculates, and distributes path and other state parameters to all registered devices, such as BPDs 130 and CPDs 140. Nodes maintain local state and the states of their immediate neighbors, and periodically send updates about their local state to central node 120.

The central node 120 precomputes a set of routes and figures out which neighbours a particular node might talk with for the purpose of forwarding packets (rather than neighbour discovery). For each device 130, 140, the central node 120 calculates the packet transmit power setting and tries to minimize the amount of radio interference between neighbours. It distributes this state to all devices in the network, updating it when necessary. According to one embodiment IPv6 is used for the network layer protocol. Nodes 130, 140 registering with a central node 120 form a logical subnet and the central node 120 acts as a default router.

RF Link Layer

Link Layer Addressing

Each node 130, 140 is identified by a unique link layer address assigned to its radio interface. Typically each one has only a single interface. Gateways can have multiple interfaces, where each interface is dedicated to a separate channel. Link layer addresses are typically 6 bytes long. The Link Layer Broadcast address is in hex ff:ff:ff:ff:ff:ff (all ones). Packets destined to local broadcast are processed by everyone who receives them.

Link Layer Header

Figure 3:
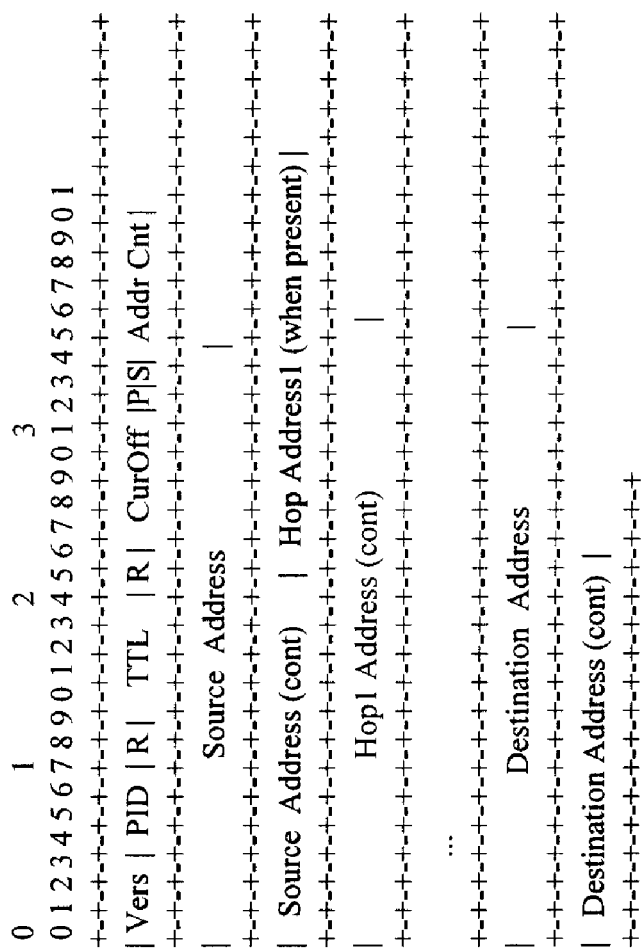
FIG. 3 illustrates an exemplary common link layer packet header, according to one embodiment.

FIG. 3 illustrates an exemplary common link layer packet header 300, according to one embodiment. Link layer header 300 is contains the following fields:

Vers Version number.
PID Protocol ID; identifier for the upper layer protocol.
R Reserved
TTL Time-to-live.
R Reserved
CurOff Current Offset; index to source address array identifying the location of the current hop.
P Priority bit; 1 indicates high priority.
S Source route bit; 1 indicates that source route follows.
Addr Cnt Number of address elements which follows, set to 2 for packets without source routes. Will be >=2 for packets with source routes.
Source Address Network address of the originator of the packet. This can never be the broadcast address.
Hop Address 1..N Addresses of intermediate hops for source routed messages.
Destination Address
  Network address of the destination. This can be the broadcast address.
  Protocol ID—Protoid identifies the protocol that the packet is carrying. This may be a specific network protocol being used, or link layer routing protocol.
List of protocols with their ID values:
  0x03: routing protocol,
  0x04: IPv4 networking protocol,
  0x06: IPv6 networking protocol,
  0x07: Datalink trace.
  TTL—This is set at each node 120, 130, where the packet is generated. The initial value is set to 'Default TTL', and is configurable. The TTL is decremented on L2-fwd. [L2-pkt-out only if it has been through L2-fwd.]
  Current Offset—This is set to 0 on packets which do not use source routes. This is set to 0 when the packet is first sent into the network. It is incremented when going through L2-fwd [L2-pkt-out after it has gone through L2-fwd].
  Priority Bit—If the priority bit is set, high priority processing is requested for these messages. This maps to 2 levels of priority provided by the MAC/PHY layer.
  Source Route Bit—Indicates whether the packet contains the entire hop-by-hop route to be used between source and destination.
  Address Count—Indicates the total number of addresses contained in the data link header including the source, destination, and any intermediate addresses for source routed packets.
  Source Address—This is the address of the node generating. According to one embodiment, it can not be set to the broadcast address.
  Hop Addresses—This is the list of addresses for source routed messages. It can contain the broadcast address.
  Destination Address—This is the address of the intended recipient of the packet. This can be the broadcast address.
  Link Layer Forwarding—If the source route bit is set, the packet header contains the full path the packet will take. Note that a packet can be source routed between two nodes with no intermediate hops (i.e., AddrCnt is 2, and the destination address is either a node or broadcast address). This is a mechanism used to interrogate individual nodes 120, 140 from a terminal such as a debugging mobile station.
  If the source route bit is not set, then the intended destination is the gateway 120, regardless of the destination address of the packet. For the case where the destination address is the broadcast address, the forwarding path is not entered because the packet is received locally. TTL gets decremented when a packet goes through a node's L2-fwd. Packets going through L2-fwd are dropped when TTL becomes zero. Messages with zero TTL destined to the local host are delivered up the stack. Nodes 130, 140 which are sending messages to the gateway 120 without using full source route set TTL to be at least the number of hops on the longest path they have leading to the gateway 120. The maximum TTL can be configured by the administrator. According to one embodiment, packets sent with the destination address set to L2 broadcast are not forwarded.

MAC Layer Behavior

Delivery of unicast packets is normally acknowledged by the MAC layer. Broadcasted packets are not acknowledged and it is possible to send unacknowledged unicast packets. When a node 130, 140 sends packets to a neighbour, the MAC layer reports the number of retries and the eventual success of the transmission. The network layer keeps counters of this information on a per neighbour basis.

Routing Subsystem

The routing subsystem is divided into 3 components:
network discovery
neighbour discovery and maintenance
node registration and route distribution Network Discovery CPD 140 starts network discovery when:
it has not associated with a gateway,
if its communication links with its upstream neighbours have been severed,
if its periodic NREG message to gateway 120 fails to get acknowledged 3 times in a row.

BPDs 130 start network discovery if the link to its nominated master (CPD node 140) has been severed.

Channel Scan—when a node starts network discovery it sends two network discovery (ND) messages on a channel:
the first discovers network and give fast feedback about visibility of any network.
the second message is used in gathering a complete list of neighbours.

CPD node 140 searches for active networks by walking through all channels, while sending broadcasted network discovery (ND) messages and waiting for an acknowledgment. If CPD 140 receives such a message, it responds with a unicast acknowledgment within 'Fast ND Time'. These ND messages, and their acknowledgments are sent with max TX power setting. This first ND is sent with 'All flag' reset, if a node eavesdrops an acknowledgment coming from some other node, it will not send a 2nd acknowledgment. CPD 140 has the ability to move fast to next channel if this one is unused.

When CPD 140 discovers an active network it stops on that channel, and does a slower scan. This slower scan is done using another ND message with a longer response time, 'Slow ND Time', and will have 'All flag' set. This causes all the neighbors to respond. Out of all the neighbours on this channel, the best one is picked to represent the network. Goodness of network is determined by looking at info reported in acks, a node which minimizes the value from formula '(15−(RSSI_from_hello+RSSI_from_ack)/2)*4+# of hops*8+gw_load' is chosen. 'gw_load' is value distributed by the gateway, and varies from 0->128, where 0 indicates least load. The CPD 140 walks through all channels, and gathers info about those networks. The walk of channels is done 3 times; the channels for which network info has been found are not visited again.

Based on the info collected from all channels, a network which minimizes the aforementioned value is elected. CPD 140 returns to this channel, and does a scan with a HELLO message in order to gather information about neighbors. Response timer in HELLO is set to 'Slow ND Time'. The list of neighbors is then sent in a node registration (NREG) message to the gateway 120.

Network Discovery Message Format

Figure 4:
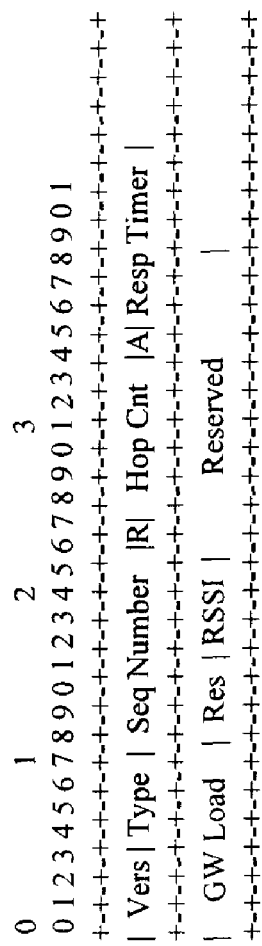
FIG. 4 illustrates an exemplary network discovery packet header, according to one embodiment.

ND messages are used for neighborhood detection and network discovery. FIG. 4 illustrates an exemplary network discovery packet header 400, according to one embodiment. The network discovery message header 400 contains the following fields:

Vers Version number.
Type Type; 1 for ND, 2 for ND_ACK
Seq Number Sequence number; filled in at the transmitter of the message, copied as such to acknowledgment.
Hop Cnt Distance from the gateway 120 in number of hops. Set to 0 on NDs, filled with distance from gateway 120. Filled with 0x7f if no paths to gateway 120 exist.
A All flag; set to 1 if everyone hearing this ND should acknowledge, 0 if duplicate acknowledgments should be suppressed. When suppression is requested, the acknowledgments are sent to broadcast address.
Resp Timer Timer for sending acknowledgments. Value is in seconds, 0 means no ack necessary.
GW Load Represents the load of a gateway 120; set to 0 by transmitter of ND, in ND_ACK filled with the latest 'GW load' number received from the gateway 120 either via NREG_ACK, or RUPD. Filled with 0xfe if no info available.
RSSI Set to 0 when sending this message, filled with RSSI of received ND in acknowledgment.

Nodes 130, 140 limit the rate at which they send out ND messages. The Resp Timer field is filled in by the transmitter of the ND recipient. It indicates the time window within which the ND_ACK 400 is sent by the recipient. It is set to 'Fast ND Time' during fast channel scan, and to 'Slow ND Time' during neighbor list gathering.

Neighbour Discovery and Maintenance

Periodic HELLOs—Map of the network 100 is maintained using HELLO protocol and passive monitoring of traffic. CPDs 140 and gateways 120 periodically broadcast HELLO messages, which are used by neighbors to collect link quality information. Periodic HELLOs are sent at the TX power indicated for this node by the gateway 120 in route update (RUPD) messages. If this node has not received route update (RUPD) messages, it uses either configured TX power value, or maximum TX power setting. Periodic HELLOs are sent once per 'HELLO Interval'.

Passive Scanning

A node ascertains the presence of a neighbor by the traffic it receives, specifically:
HELLO messages periodically sent from that neighbor.
Unicast traffic directed to any node sent from that neighbor.
Broadcast traffic from that neighbor.

According to one embodiment, messages originating from nodes which are in the process of network discovery do not reset nexthop aging.

Neighbour Table Maintenance and Active Scanning

Node assumes that it has lost connectivity to its neighbor if it hasn't seen traffic from it for 'Link Max Idle Time' period of time. When this happens, neighbor is removed from node's neighbor table. Special case are the links to upstream nodes, if CPD 140 has not been able to receive any data from its upstream neighbor, this might be due to self-interference from traffic sent by other nodes in the network 100. Node 140 starts sending unicast HELLO messages to at least one upstream neighbor to validate that it is still present. This is started at 'Link Max Idle Time'/2 of idle time. Collected information is periodically sent to the gateway 120. If CPD 140 locally determines that all the upstream neighbors are down, it initiates neighbor discovery process in this channel. If no new route to gateway 120 is found, the node enters network discovery phase.

HELLO Message Format

FIG. 5 illustrates an exemplary HELLO message header 500, according to one embodiment. HELLO messages 500 are used for searching and/or reporting the presence of a link. The HELLO message header 500 contains following fields:
- Vers Version number.
- Type Type; 3 for HELLO, 4 for HELLO ACK
- Seq Number Sequence number; filled in at the transmitter of the message, copied as such to acknowledgment.
- R Route OK flag; set to 0 by transmitter of HELLO, in acknowledgment set to 1 if it's OK to use this neighbour to send neighbour list to gateway 120.
- Hop Cnt Distance from the gateway 120 in number of hops. Set to 0 on NDs, filled with distance from gateway 120. Filled with 0x7f if no paths to gateway 120 exist.
- A All flag; set to 1 if everyone hearing this HELLO should acknowledge, 0 if duplicate acknowledgments should be suppressed. When supression is requested, the acknowledgments are sent to broadcast address.
- Resp Timer Timer for sending acknowledgments. Value is in seconds, 0 means no ack necessary.

Node Registration and Route Distribution

After the network discovery phase, there may be no valid route to gateway 120. In addition, gateway 120 does not know that the node 130, 140 is present. The node 130, 140 initially registers with the gateway 120 and periodically reports its presence to it.

In registration messages, a node 130, 140 advertises the network protocol it wants to use, e.g. IPv6. Gateway 120 rejects the registration if it is not capable of handling this protocol. Node 130, 140 registers itself by sending a Node Register message (NREG). If 'NREG retry count' number of registration attempts have not been successful, the node 130, 140 assumes that the gateway 120 is unreachable. In that case node 130, 140 re-enters network discovery phase.

The initial NREG messages are sent to a neighbor who claims in its ND_ACK to own a valid route to the gateway 120. If no such neighbor exists, or if the ack for this NREG fails to arrive, the discovery process is restarted after 'Network discovery interval' time period has elapsed. According to one embodiment, a node who is in process of doing network discovery, or whose route to gateway 120 includes the source of this HELLO as one of the path elements, does not claim that it has a valid route to gateway 120. The NREG message includes information about a node's 130, 140 immediate neighbors and this information is used by the gateway 120 to compute routes for this and other nodes in the network 100, and maintain a constantly updated node routing table for the network.

If the gateway 120 fails to receive NREG messages within 'Node Unreachable Time' it assumes the node 130, 140 has disappeared from the network 100. A sequence number is used for making sure that neighbor information from a node is not processed out-of-order. It is monotonically increasing, incremented according to rules of the lollipop model. Gateway 120 stores the previously seen NREG sequence number, and discards messages that arrive out-of-order. If gateway 120 responds to a periodic NREG message with NREG_ACK with 'N flag' set, CPD 140 slowly scans that channel again using full TX power, and reports all its neighbors. Also it re-registers all BPDs 130 who have associated with it.

Multiple messages are needed when the number of neighbors to report in NREG messages causes one to exceed link MTU size (1500 bytes). Nodes 130, 140 report all its neighbors during a registration, with a serial set of messages.

A node 130, 140 sends NREG messages one at a time, waiting for acknowledgments before sending another one. If the acknowledgment fails to arrive within 'NREG rexmit time', NREG message is retransmitted. After 'NREG rexmit count' number of failed attempts have been made with a single message, registration attempt is given up and retried after 'NREG interval'. A sequence number is incremented for every new message. 'More flag' is set in all but the last message of multipart NREG. Message number starts from zero, and is incremented by one for every message in split NREG report.

With multipart NREG messages, information about the most important neighbors is included in the first segment. These are the nodes through which the NREG message is sent, and all the upstream neighbors of the node. Missing upstream neighbor entry in the first segment means that the node has lost connectivity to it, and that gateway 120 should not use it when sending NREG_ACKs. Gateway 120 updates its routing tables after the first segment has been sent, and also when all the parts of an NREG have been received.

Node Register Message Format

Figure 6:
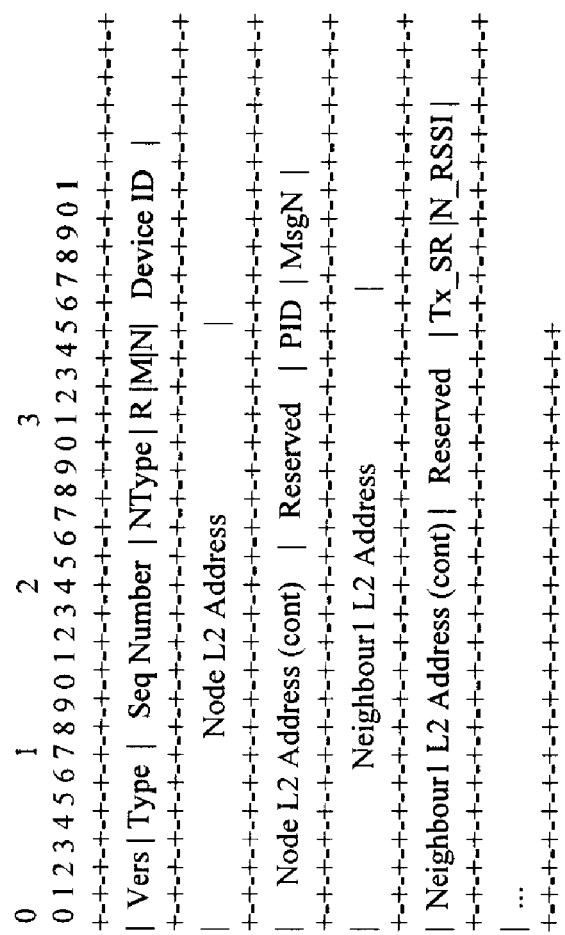
FIG. 6 illustrates an exemplary node registration message used when registering to a network, according to one embodiment.

FIG. 6 illustrates an exemplary NREG message 600 used when registering to a network 100, according to one embodiment. NREG message 600 is used to update the gateway's 120 map of the network 100. The NREG message header 600 contains following fields:
- Vers Version number.
- Type Type; 5 for NREG.
- Seq Number Sequence number; filled in at the transmitter of NREG, copied as such to acknowledgment in NREG_ACK.
- NType Node type; 0 for CPD, 1 for BPD, 2 for CPD which has backup power through battery.
- M More flag; if multiple NREG messages are needed for reporting all the neighbours, this flag is set on all but last of these messages.
- N New registration flag; set in NREG if this message is being sent after a channel scan done using full TX power. Gateway 120 sets this in NREG_ACK if it hasn't seen this meter before.
- Device ID assigned device type identifier.
  - 0x17 for GE KV2c electric meters,
  - 0x08 for gas IMUs,
  - 0x09 for water IMUs,
  - 0x0B for relays.
- Node L2 Address Address of the node sending this registration.
- PID Proto ID; identifier for the network protocol used by this node. Valid IDs are IPv4 or IPv6.
- MsgN Message number; identifies the message in sequence when multiple NREG messages are used for registration.
- Neighbour L2 Address
  - Address of neighbor. A neighbor can appear multiple times in this array.
- Tx_SR Transmit success rate; this reports the ratio of successful transmissions compared against all transmit attempts. Value is from 0 to 15.
- N_RSSI RSSI of the received messages.

Per neighbor information (L2 address and RSSI) is sent for every neighbor. Size of the packet is used in determining how many are being reported by this node. Nodes should limit the rate at which they send out NREG messages 600. An NREG message 600 sent for a BPD 130 contains only a single neighbor, this is the entry for CPD 140 it has selected as its master.

Node Register Acknowledgment Message Format

FIG. 7 illustrates an exemplary NREG_ACK message 700 sent in response to NREG message, according to one embodiment. The NREG_ACK message header 700 contains following fields:

Vers Version number.
Type Type; 6 for NREG_ACK.
Seq Number Sequence number; copied from NREG.
GW Load Represents the load of a gateway 120. Set to current load of gateway 120 on RUPD, ignored on RUPD_ACK. (RUPD refers to Route Update Message)

Nodes 130, 140 update their current TX power setting each time they receive RUPD, NREG_ACK messages. Sending a NREG_ACK with gw load 0xff commands the node to leave the current network and restart network discovery.

Route Calculation and Distribution

Route distribution is done to CPDs 140. Routes are sent to a node 140 via route update (RUPD) messages. These messages contain up to 3 full node-gateway 120 paths via different upstream neighbors. Gateway 120 recalculates routes:

periodically at every 'Route Calculation Interval',
when a node reports in NREG that all its upstream neighbors are unreachable.

Route calculation is done using shortest path first, and a single path is selected. Multiple paths are calculated, and optimized transmit power settings for each CPD are provided. A sequence number is used for making sure that path information from the gateway 120 is not processed out-of-order. In gateway 120, the path information is stored per destination, and incremented. Gateway 120 includes additional configuration information in RUPD. Gateway 120 limits the rate at which it sends RUPD messages to optimum functional levels.

Route Update (RUPD) Message Format

FIG. 8 illustrates an exemplary route update message 800 sent by gateway 120 to update settings for a CPD 140 node, according to one embodiment. RUPD messages 800 contains following fields:

Vers Version number.
Type Type; 7 for RUPD.
Seq Number Sequence number; assigned for RUPD, copied as such to RUPD_ACK.
TXPwr Transmit power which should be used for regular communication by this node.
PC Path count; number of paths included in this message.
GW Load Represents the load of a gateway 120. Set to current load of gateway 120 on RUPD, ignored on RUPD_ACK.

Nodes 130, 140 update their TX power setting with the latest transmit power information from gateway 120, each time they receive RUPD messages 600. Paths lists are optional. Node's current paths are replaced if paths are included in the latest RUPD message. Path descriptors are padded to 4 byte alignment. Path elements are in order from the node 130, 140 towards gateway 120; the address of the node 130, 140 and the gateway 120 are excluded from the list. Path metric indicates goodness of the path. RUPD messages use lollipop sequence numbering. Sending a RUPD with gw load 0xff commands the node to leave the current network and restart network discovery.

Route Update Acknowledgment (RUPD_ACK) Message Format

FIG. 9 illustrates an exemplary route update acknowledgement message 900, according to one embodiment. RUPD_ACK messages 900 contains following fields:

Vers Version number.
Type Type; 8 for RUPD_ACK.
Seq Number Sequence number; assigned for RUPD, copied as such to RUPD_ACK.
Status Status of RUPD processing; set to 0 on success, and to nonzero on failure. If node returns an error, path information has been accepted, but not the configuration info.
Error codes:
0—Success
1—Unrecognized Parameter
2—Invalid Parameter Value Lollipop Sequence Numbering in RUPD Sequence number assignment in RUPD messages follows lollipop model. Gateway 120 maintains for each CPD node 140 in the network 100 a monotonically increasing sequence number. When talking to a node for the first time, the sequence number is set to 0xff. Subsequent changes in message contents increment this value; i.e. changes in path list, TX power or GW Load. When the number reaches 0xfe, the next value that gets set is 0x00. Nodes should only allow route and configuration settings updates where sequence number of the message is larger than in the previous message. Gateway 120 does not roll this number over when none of its RUPD messages have been updated for a long time (i.e. difference between assigned sequence number and acknowledged sequence number must never grow to be larger than $2^7-1$.) If it does, sequence numbers are restarted from 0xff.

The same scheme applies to NREG sequence numbers. When a device 130, 140 talks to a gateway 120 for the first time after deciding to join a network, it starts its sequence numbers with 0xff. This is not incremented until NREG_ACK for it has been received. After this, sequence number is incremented each time node sends an NREG.

Route Update Additional Configuration Items

Gateway 120 distributes configuration variables in RUPD messages. These variable values are reset when a node 130, 140 restarts network discovery. Information in subsequent RUPD messages overwrites the previous setting. This is used in providing stateless autoconfiguration of network protocols.

Battery Powered Devices

BPD 130 discovers gateway 120 the same way as a CPD 140. After it has elected a network, it goes back to that channel, and elects one of the nodes who acknowledges its 2nd HELLO as its master, and sends a unicasted 'associate' message to it. When multiple CPDs 140 ack this HELLO message, they are ranked based on RSSI and number of currently registered BPDs 130. If the CPD 140 sends a NAK (e.g. due to not enough resources), the 2nd best device is tried and so on. If none of the devices is capable of handling this BPD 130, channel scan continues. If association is successful, CPD 140 registers this BPD 130 with the network's 100 gateway 120. CPD 140 remembers BPDs 130 which have associated with it, and if it changes gateways 120, or if it determines that the gateway 120 has lost its state (N flag set in NREG_ACK), it re-registers all its BPDs.

Routing Components

The protocol described above does not allow nodes to migrate from one network to another network, unless connectivity to a gateway 120, or its upstream neighbors have been severed. According to another embodiment, a full channel scan periodically occurs to see if one can find new networks. Having a large number of nodes migrate changes the gwload component quite a bit, which could cause that same node to migrate back to original channel very soon, as it determines its original network is functionally superior to the one it had migrated to.

Accordingly, when nodes move over from their primary route to secondary route, it is possible that the packets will end up in a routing loop. If sending packets on secondary/tertiary path, the full path to gateway 120 is included in the packet. If gateway 120 fails, it might take quite a while for all nodes to migrate to a new channel. This could be made faster, if a node 130, 140 after discovering a new, functional network 100 returns to its old channel and broadcasts a message to its immediate neighbors saying that its about to move out. Neighbors then mark this neighbor unreachable immediately, and restart network discovery.

In case of a power outage, a lot of nodes 130, 140 become active at the same time. To alleviate the flurry of network discovery messages this generates, nodes 130, 140 store network info in persistent storage. If paths change due to NREG arriving to a gateway 120, it sends out an NREG_ACK, and an RUPD, which in turn is acknowledged by the node doing registration. Optimization includes path information along with NREG_ACK. This contains a sequence number from the same space as route updates, Otherwise path updates could be reordered.

Network Protocol

Conceptually, LAN forms an NBMA (non-broadcast-multiple-access) network. Multicast, and broadcast transmissions are possible, but the transmission has to be routed through the central node 120. Router advertisement, router solicitation, and redirect messages are supported. CPDs 140 and BPDs 130 process routing headers when they are the final destination, and return errors if the processing of the routing header requires them to forward the packet to another node. This ensures that the nodes are not inappropriately used in relaying packets to the greater Internet, or as components in DoS attacks.

Stateless Address Autoconfiguration

An EUI-64 identifier is constructed from link layer addresses similarly as to how it is done for Ethernet interfaces. The first 3 octets of the MAC address are followed by FFFE and the last 3 octets of the MAC address. RUPD messages contain an additional network prefix, and nodes generate their address from this by appending the interface identifier to this prefix.

Neighbor Cache

An IPv6 neighbor cache contains entries for nodes which are on-link as indicated by a network prefix of the address for a shared link. These might not be directly reachable, given that this is a multihop network. Definition of a neighbor in IPv6 is different from what it is at the link layer. IPv6 neighbor caches contain entries where the link layer destination is either a single address, or an array of link layer addresses. The array is for source-routing the packet through the network 100, and contains addresses of all intermediate hops. Entries will be added as a result of receiving RUPD messages from a gateway 120 or with ICMP Redirects.

Address Resolution and Nexthop Selection

Nexthop selection for a node is done by first consulting a neighbor cache for a matching entry. If no such entry exists, a link layer neighbor list is consulted. IPv6 addresses for nodes which are reachable directly from this node are constructed based on their MAC address. If the route to destination is still not found, the packet is sent to the gateway 120. Gateway 120 responds with ICMP Redirect if the destination is located in local network, or it forwards the packets on behalf of the source. Multicast traffic originated by these nodes is always sent directly to gateway 120.

Configuration Parameters

Default TTL TTL value in link layer header.
  Default: 8, min 2, max 64.
Fast ND Time How much response time is given in ND used for discovering network.
  Default: 1 second, min 1 sec, max 127 sec.
Slow ND Time How much response time is given in ND used for discovering neighbors.
  Default: 10 seconds, min 1 sec, max 127 sec.
HELLO Interval How frequently nodes should broadcast HELLO messages after registration. One must add randomness to sending these, random component should be +−⅓ of period.
  Default: 360 seconds, min 10 sec, max 7200 sec.
Link Max Idle Time If no packets are received from a neighbor during this time period, it is determined that it's not there anymore.
  Default: 5*HELLO interval,
    min 3*HELLO interval,
    max 10*HELLO interval.
NREG Interval How frequently nodes should send their updated list of neighbors to the gateway 120. One must add randomness to sending these, random component should be +−⅓ of period.
  Default: 240 minutes, min 10 mins,
    max 3600 minutes.
NREG Retry Count How many times a node attempts registration before determining that gateway 120 is down, and that it should start searching from other channels.
  Default: 2, min 1, max 15.
NREG Rexmit Count How many times a node transmits NREG before giving up on this registration attempt.
  Default: 3, min 2, max 15.
NREG Rexmit Time How long node waits for NREG_ACK after sending NREG before trying retransmit, or giving up.
  Default: 10 secs, min 3 secs, max 60 secs.
Network discovery interval If no network has been found, this is how long node must sleep (wait) before restarting channel scan. Random component must be added to sleep, it should be +−⅓ of period.
  Default: 60 minutes, min 10 min, max 3600 mins.
Node Unreachable Time How long the gateway 120 has to be missing NREG messages from a node before deciding that it has disappeared from the network.
  Default: 6*NREG interval, min 4*NREG interval, max 64*NREG interval.
Node Dead Time How long the gateway 120 has to be missing NREG messages from a node before clearing state about the node.
  Default: 64*NREG interval, min 24*NREG interval, max never.
Route Calculation Interval How frequently gateway 120 recalculates routes for the network.

Although the present method and system have been described in connection with a utility management and distribution systems, one of ordinary skill would understand that the techniques described may be used in any situation where it is to effectively manage and organize various utilities.

A method and system for providing a network protocol for utility services have been disclosed. Although the present methods and systems have been described with respect to specific examples and subsystems, it will be apparent to those of ordinary skill in the art that it is not limited to these specific examples or subsystems but extends to other embodiments as well.

Although the present method and system have been described in connection with a utility management and distribution systems, one of ordinary skill would understand that the techniques described may be used in any situation where it is to effectively manage and organize various other types of devices deployed to monitor and register any type of information originating at the location where each device, CPD 130, BPD 140 is deployed.

What is claimed is:

1. A method of connecting a node to a wireless network, comprising:
   (i) transmitting a first type of broadcast message from a first node over each of a plurality of channels, seeking a response from any other node that communicates on at least one of said channels;
   (ii) upon receiving a response from another node communicating on one of the channels, transmitting a second type of broadcast message from the first node on said one channel, seeking responses from multiple other nodes communicating on said one channel; and
   (iii) processing responses received at the first node to said second type of broadcast message, to select one of the other nodes communicating on said one channel, from which a response is received, as a neighbor link in a path for communications over a network associated with said one channel.

2. The method of claim 1, further comprising repeating steps (ii)-(iii) for each of said plurality of channels, and selecting one channel based upon the responses received to said second type of broadcast message.

3. The method of claim 1, wherein said first type of broadcast message has a first response time, and said second type of broadcast message has a second response time that is longer than said first response time.

4. The method of claim 1 further comprising receiving a third type of message that is periodically broadcast by other nodes on network, and updating status and quality of link information for other nodes from which said third type of message is received, based upon information associated with said third type of messages.

5. The method of claim 1 further comprising periodically broadcasting a third type of message from said first node, to update status and quality of link information pertaining to said first node.

6. The method of claim 1 further comprising transmitting a registration message, via the selected other node, to a gateway associated with the network to register the first node as a member of the network.

7. The method of claim 6 wherein said registration message includes an identification of a network protocol that is used by said first node to communicate messages via said network.

8. The method of claim 7, wherein said network protocol is IPv6.

9. The method of claim 6 wherein said registration message includes information about other nodes from which responses to said second type of message were received.

10. The method of claim 9 wherein said gateway computes and maintains routes for communications with said gateway, based upon the information that is provided by nodes in said registration messages.

11. The method of claim 10, further comprising transmitting said routes from the gateway to the nodes.

12. The method of claim 6 wherein, in response to receipt of a registration message, the gateway returns a message to the node that includes a network prefix, which the first node uses to generate a network address.

13. The method of claim 6 further comprising receiving a third type of message that is periodically broadcast by other nodes on network, which message includes information regarding the quality of a path to the gateway via the node transmitting the third type of message.

14. The method of claim 13, wherein a node is selected by the first node as a neighbor link on the basis of the quality information contained in the third type of message.

15. The method of claim 14, wherein said quality information includes the number of hops to the gateway from the other node that is transmitting the third type of message.

16. The method of claim 14 wherein the selection of a node as a neighbor node is also based on the quality of the link to the first node from the node transmitting the third type of message.

17. The method of claim 13, wherein the third type of message also includes information regarding the traffic density of the path to the gateway.

18. The method of claim 17, wherein a node is selected by the first node as a neighbor link on the basis of the quality information and the traffic information contained in the third type of message.

19. A method of registering a node in a wireless network, comprising:
    transmitting a first type of broadcast message to discover the existence of a network;
    upon discovering a network, transmitting a second, different type of broadcast message to identify neighboring nodes on said network; and
    transmitting a registration message, via at least one of said neighboring nodes, to a gateway on the network, said registration message including an identification of the node being registered and information regarding the neighboring nodes that have been identified.

20. The method of claim 19, wherein said first type of broadcast message has a first response time, and said second type of broadcast message has a second response time that is longer than said first response time.

21. The method of claim 19 further comprising periodically broadcasting a third type of message, to update status and quality of link information pertaining to the node from which the third type of message is broadcast.

22. The method of claim 19 wherein said registration message includes an identification of a network protocol that is used to communicate messages via said network.

23. The method of claim 22, wherein said network protocol is IPv6.

24. The method of claim 19 wherein said gateway computes and maintains routes for communications with said gateway, based upon the information that is provided by nodes in said registration messages.

25. The method of claim 24, further comprising transmitting said routes from the gateway to the nodes.

26. The method of claim 19 wherein, in response to receipt of a registration message from a node, the gateway returns a message to the node that includes a network prefix, which the node uses to generate a network address.

27. A method of registering a node in a wireless network, comprising:
    transmitting, from a first node, a broadcast message to discover the existence of a network;
    upon discovering a network, transmitting a second broadcast message from the first node to identify neighboring nodes on said network;
    selecting one of the identified neighbor nodes on the network as a master node, and sending a message from the first node to the selected node requesting the selected node to function as the first node's master; and
    upon accepting the request to function as a master at the selected node, transmitting a registration message to a gateway on the network from the master node to register the first node with the gateway.

28. The method of claim 27, wherein the first node is a battery powered device and the master node is a constant powered device.

29. The method of claim 28, wherein at least one of the first node and the master node includes a utility meter.

30. The method of claim 27 wherein, when the master node registers with a new gateway, and/or re-registers with its current gateway, it also registers all nodes for which it s functioning as a master node.

31. A method of registering a node in a wireless network, comprising:
   transmitting, from a first node, a broadcast message to discover the existence of a network;
   upon discovering a network, transmitting a second broadcast message from the first node to identify neighboring nodes on said network;
   sending a third message from the first node to one of the identified neighbor nodes that is capable of functioning as an intermediary node; and
   upon receiving the third message at the intermediary node, transmitting a registration message to a gateway on the network from the intermediary node to register the first node with the gateway.

32. The method of claim 31, wherein the first node is a battery powered device and the intermediary node is a constant powered device.

33. The method of claim 32, wherein at least one of the first node and the intermediary node includes a utility meter.

34. The method of claim 31 wherein, when the intermediary node registers with a new gateway, and/or re-registers with its current gateway, it also registers all nodes for which it s functioning as an intermediary node.

* * * * *